340-567 SR
7/13/82 XR 4,339,748

United States Patent [19]

Guscott et al.

[11] 4,339,748

[45] Jul. 13, 1982

[54] MULTIPLE RANGE PASSIVE INFRARED DETECTION SYSTEM

[75] Inventors: John K. Guscott, Lynnfield; Robert Powers, Norwell, both of Mass.

[73] Assignee: American District Telegraph Company, New York, N.Y.

[21] Appl. No.: 138,311

[22] Filed: Apr. 8, 1980

[51] Int. Cl.[3] .......................... G02B 5/10; G08B 13/18

[52] U.S. Cl. .................................... 340/555; 250/342; 250/352; 250/353; 340/567; 350/299

[58] Field of Search ............... 340/555, 556, 557, 565, 340/567; 250/342, 352, 353, 349; 350/295, 299, 292, 293

[56] References Cited

U.S. PATENT DOCUMENTS

| | | | |
|---|---|---|---|
| 3,056,106 | 9/1962 | Hendricks | 340/567 X |
| 3,466,119 | 9/1969 | Francia | 350/293 X |
| 3,703,718 | 11/1972 | Berman | 340/567 |
| 3,744,885 | 7/1973 | Hurtado et al. | 350/299 X |
| 3,858,192 | 12/1974 | Fischer | 340/555 X |
| 3,886,360 | 5/1975 | Reiss et al. | 250/353 X |
| 3,923,382 | 12/1975 | Harding | 250/353 X |
| 3,972,598 | 8/1976 | Kunz | 250/353 X |
| 3,988,726 | 10/1976 | Reiss et al. | 340/567 |
| 4,081,680 | 3/1978 | Keller | 250/342 |
| 4,179,691 | 12/1979 | Keller | 250/349 X |
| 4,195,234 | 3/1980 | Berman | 340/567 X |

FOREIGN PATENT DOCUMENTS

| | | | |
|---|---|---|---|
| 2855322 | 7/1979 | Fed. Rep. of Germany | 340/555 |

*Primary Examiner*—John W. Caldwell, Sr.
*Assistant Examiner*—Joseph E. Nowicki
*Attorney, Agent, or Firm*—Weingarten, Schurgin & Gagnebin

[57] ABSTRACT

A passive infrared detection system which exhibits a consistent optical aperture and sensitivity over different operating ranges. The system includes a mirror assembly having a plurality of spherical segments arranged in two or more ranks, each corresponding to a different operating range. Each mirror segment is disposed at its respective focal length from a detector, and is of a size and configuration to provide an intended optical aperture to achieve uniform detection sensitivity irrespective of the range of the target.

17 Claims, 21 Drawing Figures

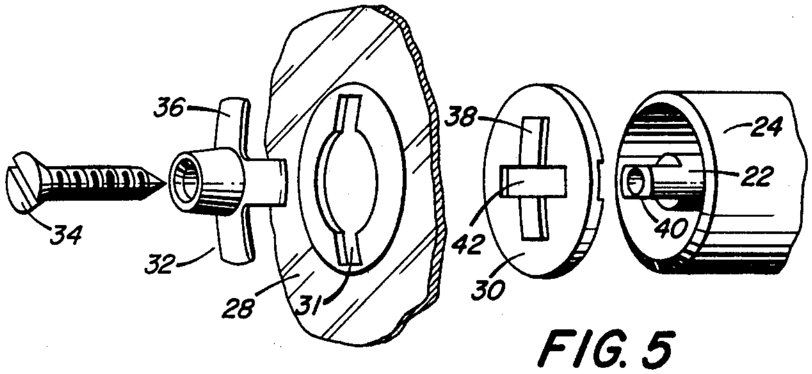
FIG. 5
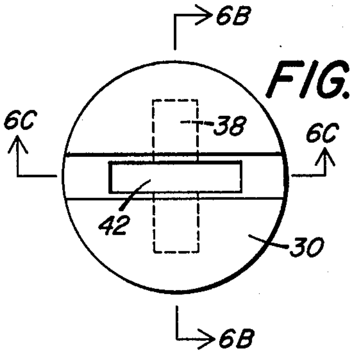
FIG. 6A
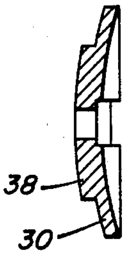
FIG. 6B
FIG. 6C
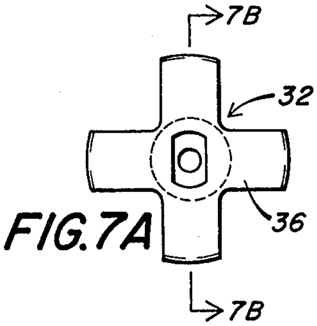
FIG. 7A
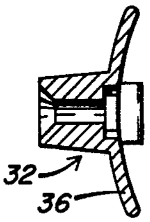
FIG. 7B
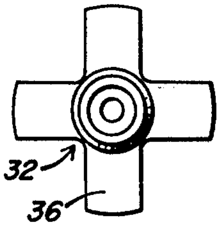
FIG. 7C
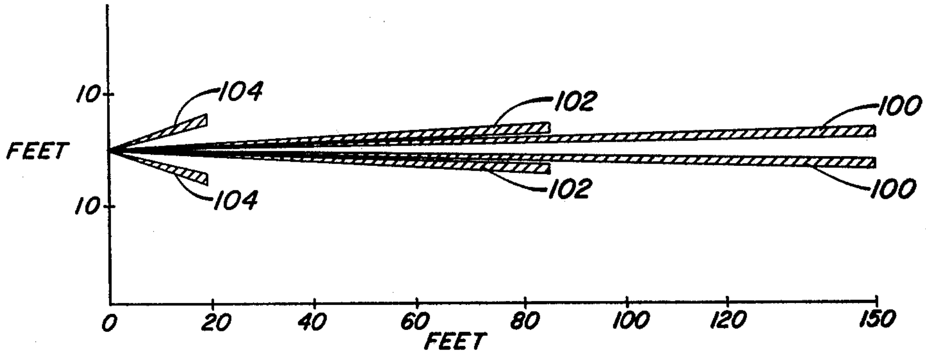
FIG. 8
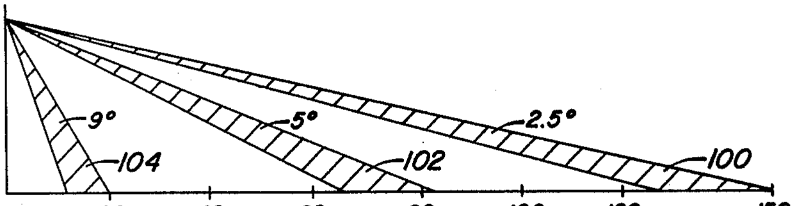
FIG. 9

MULTIPLE RANGE PASSIVE INFRARED DETECTION SYSTEM

FIELD OF THE INVENTION

This invention relates to intrusion detection systems, and more particularly to a passive infrared system for detection of a moving intruder.

BACKGROUND OF THE INVENTION

Passive infrared intrusion detection systems are known for sensing the presence of an intruder in a protected area and providing an output signal representative of intruder detection. The performance of such systems is often specified for a particular range; that is, the distance from an intruder to the detector. The performance of the system outside of the specified range can become significantly diminished and thus the ability to reliably detect intruder presence outside of the specified range is reduced. In a single focal length system, an intruder travelling at uniform velocity will be in the field of view longer at further distances from the detector than at shorter distances. The detection sensitivity is therefore variable with the distance of an intruder from the detector. It would be useful to optimize system performance over widely different ranges to provide reliable intruder detection anywhere within a protected space.

Examples of passive infrared intrusion detection systems are shown in U.S. Pat. Nos. 3,036,219; 3,524,180; 3,631,434; 3,703,718; and 3,886,360. In U.S. Pat. No. 3,886,360 an infrared intrusion detection system is shown in which an array of spherical mirror segments is employed to provide greater intensity of radiation received from more distant objects. In one disclosed embodiment, the mirror segments are of the same focal length with the sensing element being disposed asymmetrically to receive more radiation from those segments collecting radiation from the further objects. In a second disclosed embodiment, the spherical mirrors are of different focal lengths, each spaced its focal distance from the detector to provide greater collection of radiation from the more distant objects.

SUMMARY OF THE INVENTION

In brief, the present invention provides a passive infrared intrusion detection system which exhibits a consistent optical aperture and sensitivity over different operating ranges. The system includes a mirror assembly having a plurality of spherical segments which are circumferentially offset from each other and all of which are disposed about a common optical axis. The spherical segments are arranged in two or more ranks, each corresponding to a different operating range. A shorter range tank of spherical segments is oriented to provide a corresponding field of view, with each segment having a first local length. A longer range rank of spherical segments provides a respective field of view, with each of these segments having a second focal length. Each rank is disposed along the optical axis at the respective focal lengths from a detector. One or more additional ranks can be provided for further fields of view. The mirror segments of the shorter range rank are relatively small to conserve space for provision of larger mirrors in the longer range rank. Since no field of view uses only the outer edge of the mirrors, the mirrors can be spherical rather than parabolic, since the slight defocussing is not sufficient to materially degrade image quality. The detector is preferably a differential dual detector which is employed in conjunction with alarm circuitry to signify intruder presence.

DESCRIPTION OF THE DRAWINGS

The invention will be more fully understood from the following detailed description taken in conjunction with the accompanying drawings, in which:

FIG. 5 is an exploded pictorial view of the mirror assembly angular adjustment means;

FIGS. 6A, 6B, and 6C are top and sectional views, respectively, of member 30 of the angular adjustment means;

FIGS. 7A, 7B, and 7C are top, sectional, and cutaway bottom views, respectively, of member 32 of the angular adjustment means;

FIG. 8 illustrates the field pattern in azimuth of the mirror assembly of FIGS. 1–3;

FIG. 9 illustrates the field pattern in elevation of the mirror assembly of FIGS. 1–3;

DETAILED DESCRIPTION OF THE INVENTION

Figure 1:
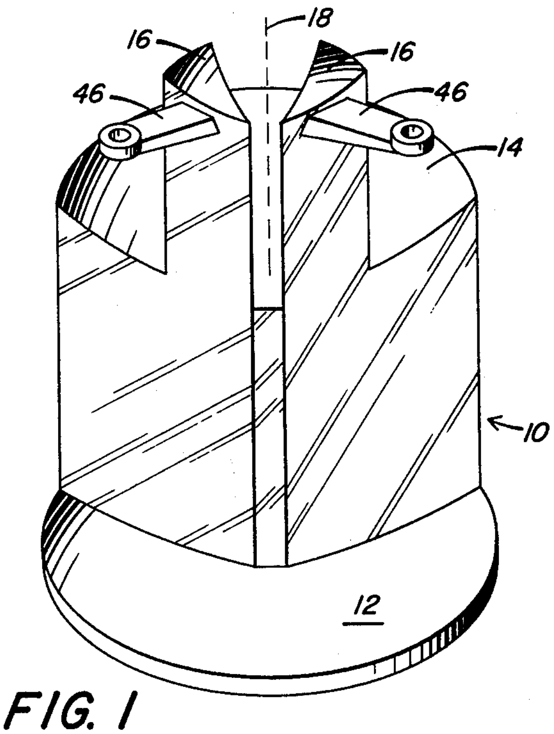
FIG. 1 is a pictorial view of a mirror assembly in accordance with the invention.
Figure 2:
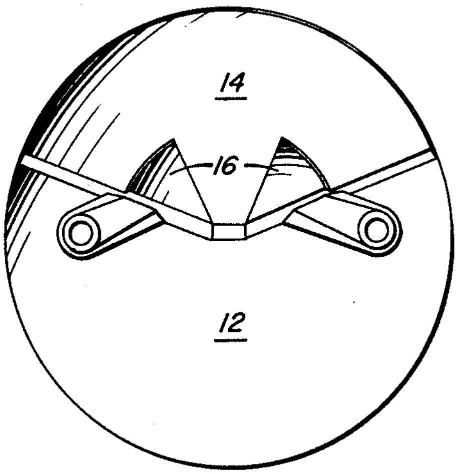
FIG. 2 is a top view of the mirror assembly of FIG. 1.
Figure 3:
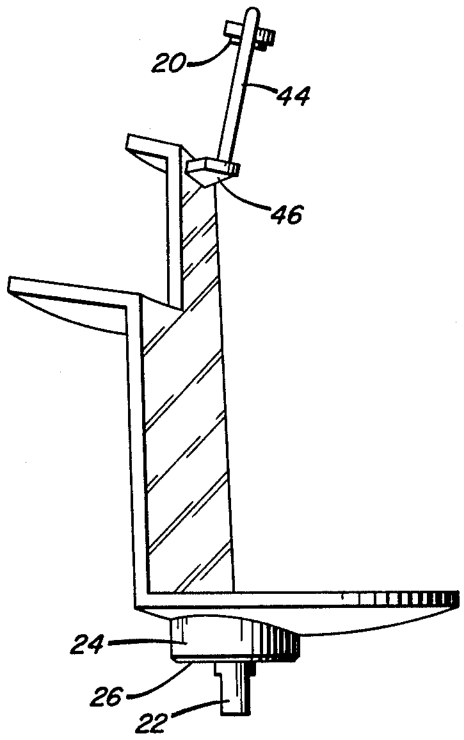
FIG. 3 is a side view of the mirror assembly of FIG. 1.

Referring to FIGS. 1–3, there is shown a mirror assembly 10 which includes a relatively large spherical segment 12, a smaller spherical segment 14 disposed a first distance from mirror 12, and a pair of still smaller spherical segments 16 which are disposed predetermined distances from segments 12 and 14. These mirrors are all disposed about a common optical axis 18. A detector 20 is disposed on the optical axis at the focal point of the several mirrors. The mirror 12 has a first focal length, mirror 14 has a second shorter focal length, and mirrors 16 a still shorter focal length. Each mirror is at the focal distance from the detector 20 to focus infrared radiation incident on the respective mirrors onto the detector. The detector 20 is supported on a U-shaped arm 44, the ends of which are secured in mounting tabs 46 on the mirror assembly.

Preferably, the mirror assembly 10 is integrally formed of a suitable plastic material such as acrylic with a coating of aluminum or other reflective material providing the mirror surfaces. An adjustable support extends from the rear of the mirror assembly and includes a central post 22 and a coaxially surrounding tubular member 24. The outer edge 26 of member 24 is beveled for mating with a mounting surface to be described.

Figure 4:
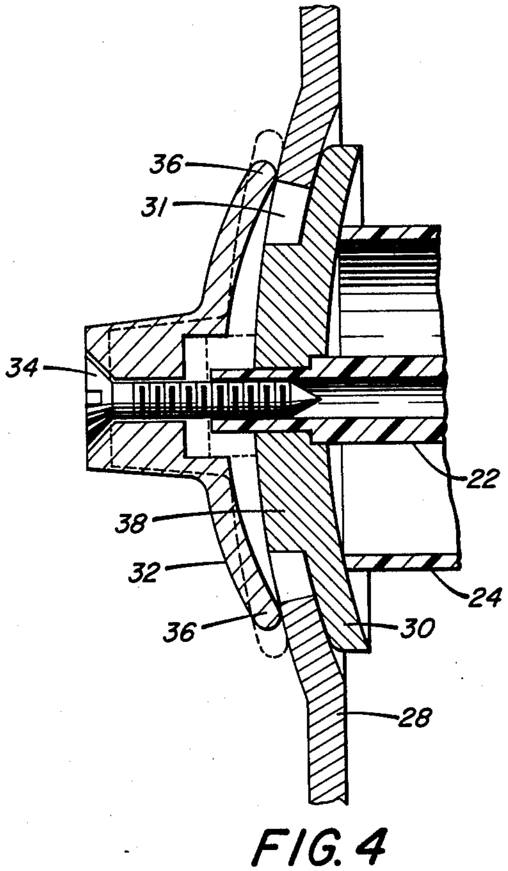
FIG. 4 is a cutaway sectional view of the means for angular adjustment of the mirror assembly.

As seen in FIGS. 4 and 5, the mirror assembly 10 is adjustably secured to a support housing 28 by means of members 30 and 32. Member 30 is installed on post 22, while the member 32 is fastened to the outer end of the post 22 by means of a machine screw 34. The arms 36 of member 32 are resilient, and upon tightening of screw 34, the member is moved inward to clamp the confronting walls of housing 28 by the arms 36 and the periphery of member 30. The tightened orientation of the spring member is illustrated in FIG. 4 in dotted outline. The member 30 and 32 are respectively shown in FIGS. 6 and 7.

The housing 28 includes an opening 31 to permit movement of member 30 and the mirror assembly. The member 30 includes ridges 38 which are disposed and slidable within the vertical slot portion of opening 31. The flatted end 40 of post 22 is slidable within a horizontal slot 42 of member 30. The mirror assembly can be angularly adjusted in the vertical plane by movement of member 30 in relation to housing 28 in opening 31. The post 22 and member 32 move together with member 30 for such vertical adjustment. Angular adjustment of the mirror assembly in the horizontal plane is provided by movement of post 22 and member 32 within horizontal slot 43 of member 30. Such adjustment is most readily accomplished by loosening screw 34 to permit intended orientation both vertically and horizontally of the mirror assembly, and then tightening the screw to secure the assembly in position by the clamping action afforded by members 30 and 32.

The field pattern in azimuth of the fields of view provided by the mirror assembly of FIGS. 1–3 is shown in FIG. 8. Each field of view includes two field patterns for the respective thermopile of the dual detector. The relative length of the respective field patterns illustrates the relative ranges of the different fields of viewing. Thus, the long central pattern 100 is provided by mirror 12, the intermediate length pattern 102 is provided by mirror 14, and the two shorter patterns 104 are provided by mirrors 16. The field pattern in the elevation plane is depicted in FIG. 9. For convenience, the illustrated field patterns are referred to as beams, it being understood that the term refers to a sensitivity pattern or zone of sensitivity. This embodiment is especially suited for corridors or hallways which are relatively long and narrow. The longest beam 100 has a 150-foot (45.7 meters) range and a beam width of about 2.5 degrees. The intermediate beam 102 has a range of about 80 feet (24.4 meters) and a 5 degree beam width. The shortest beams 104 have a range of about 20 feet (6.1 meters) and a 9 degree beam width.

Figure 10A:
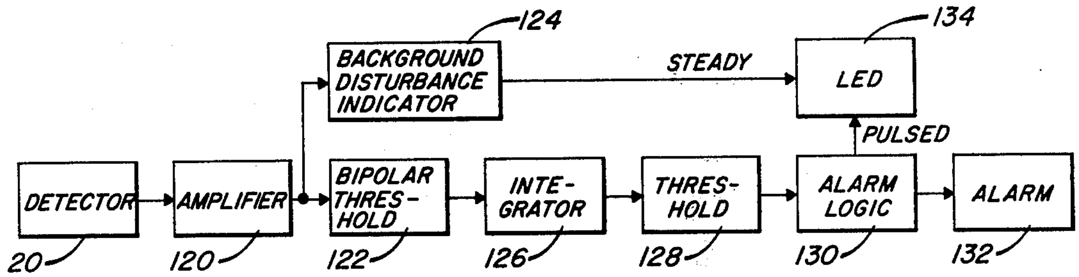
FIG. 10A is a block diagram of the electronic circuitry for processing the detector output signal.

The detector 20 includes a dual thermopile having two detecting elements connected in electrical phase opposition. Each element is responsive to a respective portion of the viewing field. An intruder detection by one element causes a first transition in signal level, which intruder detection by the other element causes an opposite signal level transition. The signal level changes are processed by the electronic circuitry illustrated in typical embodiment in FIG. 10A to provide an output alarm indication. Referring to FIG. 10A, the detector output signal is applied to an amplifier 120, the output of which is applied to a bipolar threshold circuit 122, and to a background disturbance indicator circuit 124. The output of the threshold circuit 122 is applied to an integrator 126, the output of which is applied to a threshold circuit 128. The output of circuit 128 is provided to alarm logic 130, the output of which is the alarm output signal which can be employed to drive an alarm 132. Alarm logic 130 also provides an output signal to an LED or other indicator 134. This indicator also receives a signal from background disturbance indicator circuit 124.

In operation, an intruder moving through the fields of view of the system causes output pulses from the detector 20 which, after amplification, are applied to the bipolar threshold, which provides output pulses corresponding to the pulses received thereby which exceed either the positive or negative threshold level. The output pulses from the threshold circuit 122 are integrated by integrator 126, and when the integrated signal exceeds the threshold level provided by threshold circuit 128, a signal is provided to alarm logic 130, which provides the alarm output signal. The alarm logic provides a pulsed signal to LED 134 to provide a blinking visual indication of intruder detection. The LED 134 can also be energized in a steady manner to denote the presence of a background disturbance as sensed by circuit 124. As is known, the background disturbance indicator senses relatively slow variations in background infrared radiation in the fields of view, and when the level of such background radiation exceeds a predetermined level, the circuit 124 denotes that condition by energizing LED 134.

The detection system has uniform performance over the entire set of widely differing ranges. The sensitivity of the system to an intruder is substantially the same for all operating ranges. Thus, for example, an intruder at a 100-foot (30.5 meters) range is detected with the same sensitivity as an intruder at a range of 25 feet (7.6 meters) from the system. The time-on-target of a moving intruder is also similar for all operating ranges of the system. The shorter range fields of view are more divergent than the longer range fields of view, and as a result, small-size intruders, such as small animals, are less likely to cause an alarm because of the relative insensitivity of the system to such small size intruders within the relatively large closer field. In other words, a small animal is unlikely to be occupying sufficient area in the field of view to cause an alarm signal. The shorter range fields of view are provided by relatively small mirror segments which results in conservation of space for larger mirror segments needed for the longer range fields of view. Thus, the mirror assembly of the invention is highly efficient in its use of space by the arrangement of differently sized mirror segments to accommodate the respective fields of view.

Figure 10B:
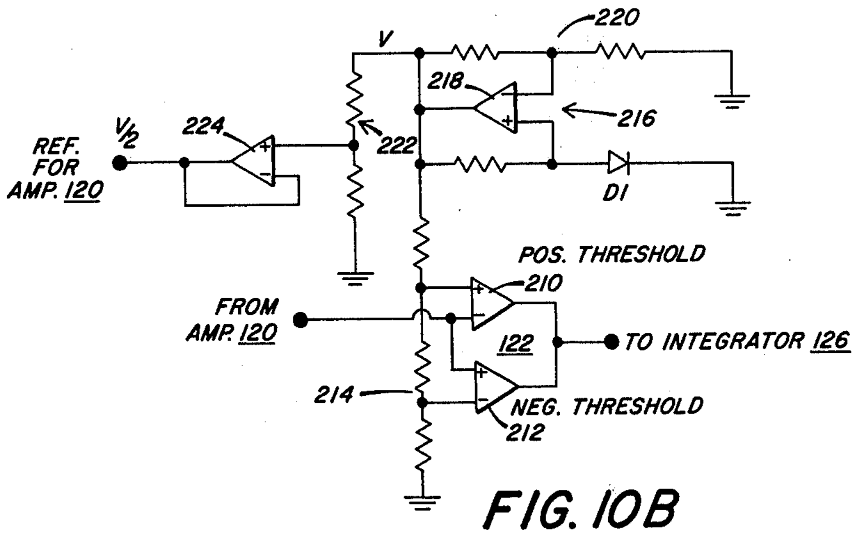
FIG. 10B is a schematic diagram of temperature compensating circuitry which can be employed in the circuitry of FIG. 10A.
Figure 12:
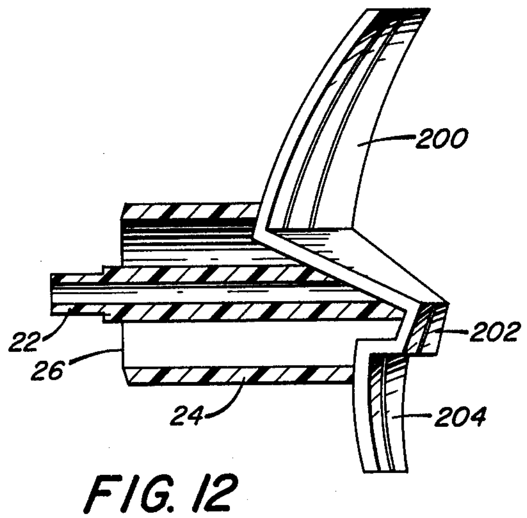
FIG. 12 is a sectional view of the mirror assembly of FIG. 11.
Figure 11:
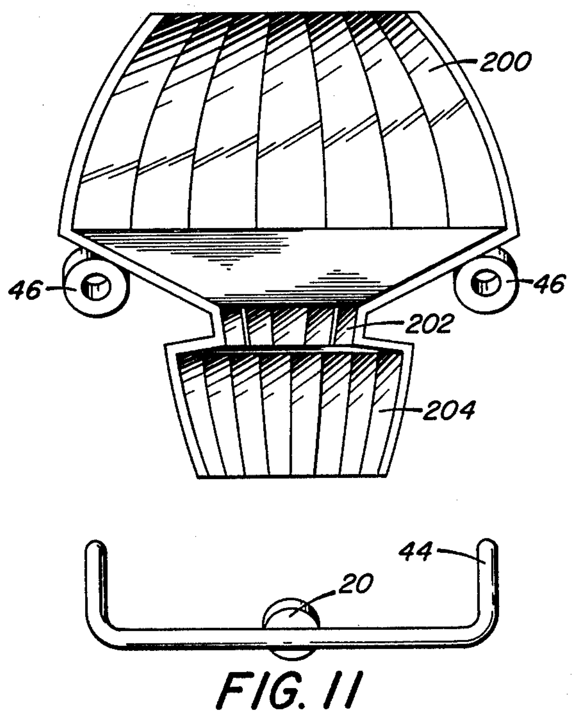
FIG. 11 is a front view of an alternative mirror assembly in accordance with the invention.
Figure 13:
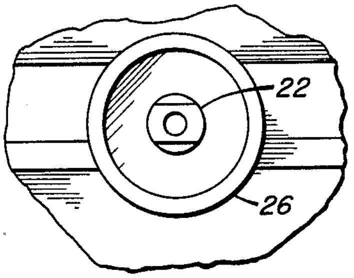
FIG. 13 is a cutaway rear view of the mirror assembly of FIG. 11.
Figure 14:
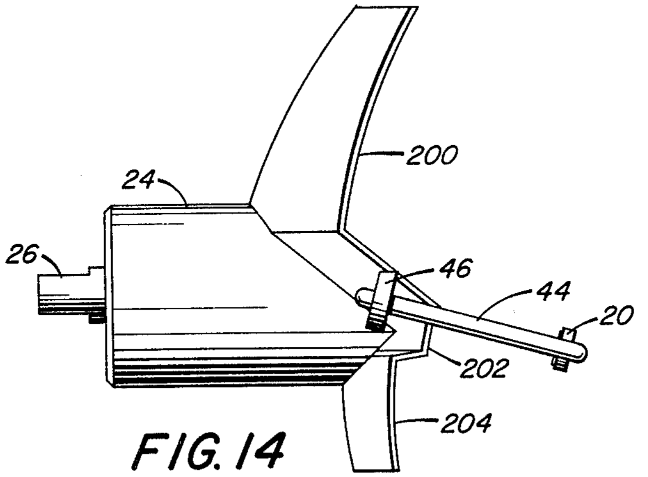
FIG. 14 is an elevation view of the mirror assembly of FIG. 11.

The sensitivity of a passive infrared system to an intruder changes with ambient temperature. In this invention, such sensitivity variation is automatically compensated by the circuit of FIG. 10B. In the illustrated schematic, the bipolar threshold detector circuit 122 is composed of respective differential amplifiers 210 and 212 which provide respective positive and negative threshold levels. The reference voltages for the amplifiers 210 and 212 are derived from a voltage divider 214 coupled to the output of a differential amplifier 218. A temperature compensation circuit 216 is composed of differential amplifier 218 which receives a temperature dependent voltage derived from a diode D1. As is known, the forward voltage across a silicon diode is inversely related to temperature; thus, the diode voltage decreases with increasing temperature, and increases with decreasing temperature. The reference voltage for amplifier 218 is provided by voltage divider 220. The output voltage V of amplifier 218 is divided by two by means of voltage divider 222 and applied to a buffer amplifier 224 which provides a reference or bias voltage V/2 for amplifier 120. The signal input from amplifier 120 to the bipolar threshold 122 is centered above the bias level V/2, this level being variable in accordance with the temperature sensed by diode D1. The threshold voltages for the bipolar threshold circuit 122 decrease with increasing temperature, thereby providing increased sensitivity with higher temperature.

As the background temperature approaches the temperature of the intruder, the threshold levels of the threshold circuit 122 are decreased to thereby increase the sensitivity of the system for more reliable detection of an intruder. Ideally, as background temperature increases, the sensitivity should increase up to the intruder temperature and thereafter decrease. In practical installations, it is unlikely that the background temperature will be higher than the temperature of a human intruder, and thus a gain or sensitivity characteristic which simply increases with temperature is sufficient. As desired, a gain characteristic having a break point at the intruder temperature can be provided such that the sensitivity increases up to the intruder temperature and then decreases for higher temperatures.

The focal length of each mirror segment is determined to image an intruder at a respective range onto the detector. For each of the operating ranges, the mirror segments are operative to provide an image of substantially equal size at the detector, thereby to provide uniform sensitivity over the widely different operating ranges. For the aperture of each mirror segment to be similar, the ratio of each mirror segment to the next smaller segment will be 4:1. As an example, in the embodiment of FIGS. 1-3, if the detector element is 0.157 inches (0.4 centimeter) in length, and an intruder 48 inches (121.9 centimeters) long is to be imaged onto this detector at ranges of 100 feet (30.5 meters), 50 feet (15.2 meters), and 25 feet (7.6 meters), the focal length of rank of mirror segments 12, 14, and 16 will be approximately 3.9 inches (9.9 centimeters), 1.9 inches (4.8 centimeters), and 1 inch (2.5 centimeters), respectively. For a total available area of 7.07 square inches, (45.6 square centimeters), corresponding to a 3-inch (7.6 centimeters) available diameter, the mirror segments 12, 14, and 16 will have respective areas of about 5.32 square inches (34.3 square centimeters), 1.33 square inches (8.6 square centimeters), and 0.33 square inches, (2.1 square centimeters). Each mirror segment provides an image which is of substantially the same size for a given target at the respective ranges. Since each field of view is optimized for the corresponding range, a given intruder will be detected in a similar manner independently of range. As a result, the detection sensitivity is more uniform, irrespective of the range of any particular target.

Figure 15:
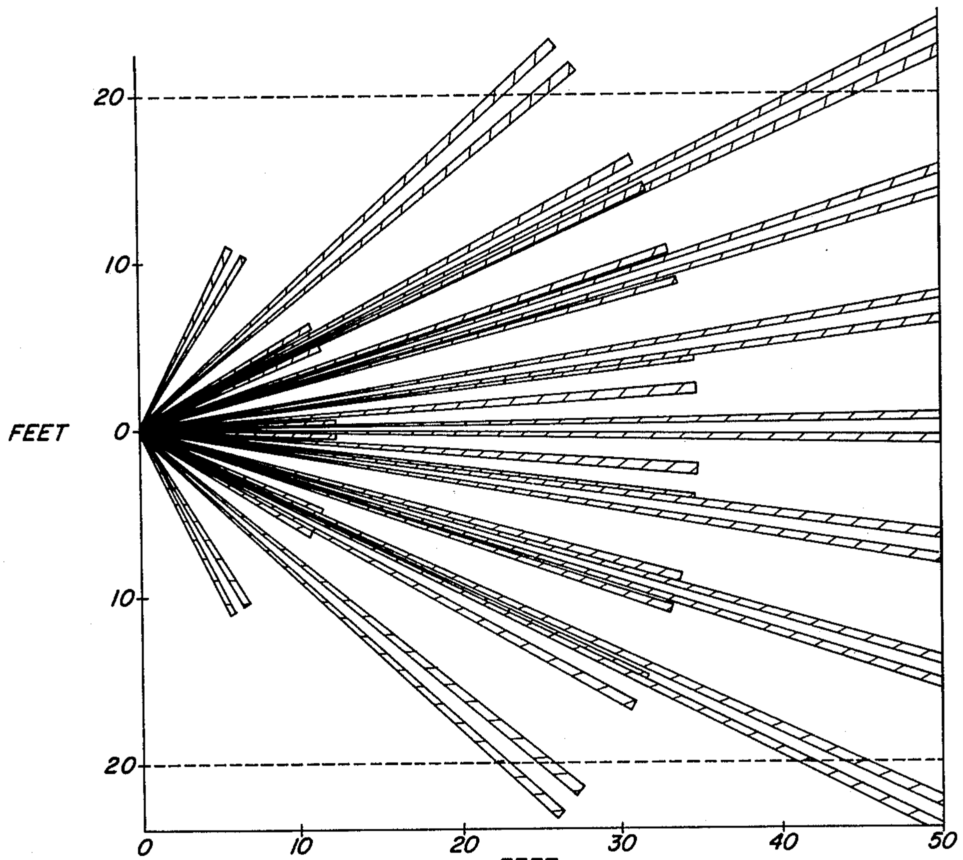
FIG. 15 illustrates the field pattern in azimuth of the mirror assembly of FIGS. 11–14.
Figure 16:
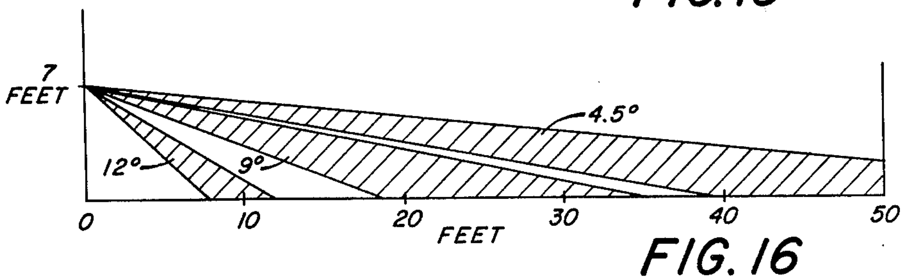
FIG. 16 illustrates the field pattern in elevation of the mirror assembly of FIGS. 11–14.

An alternative embodiment is shown in FIGS. 11-14 wherein the mirror assembly includes a first array 200 of spherical segments, each having a first focal length and circumferentially disposed. A second circumferentially arranged array 202 of spherical mirror segments is provided below the first array, each of these segments having a second focal length. A third array 204 of spherical segments is provided below the second array, each of a third focal length. In the illustrated embodiment, the first array includes seven mirror segments, the second array includes five mirror segments, and the third array includes eight mirror segments. Each array of mirrors is disposed at its focal distance from the detector 20 as described above, and the mirror assembly is angularly adjustable in the manner described above. The field pattern of the mirror assembly of FIGS. 11-14 in the azimuth plane is shown in FIG. 15, and in the elevation plane in FIG. 16. The mirror array 200 provides the longest range field patterns, the array 204 provides the shortest range field patterns, while the intermediate range field patterns are provided by the array 202. This embodiment provides coverage of a rectangular space of about 30 by 50 feet (9.1 by 15.2 meters). The specific operating ranges and beam angles are of course a matter of design choice.

The mirror assembly and electronic circuitry are typically contained within a single housing adapted to be mounted on a wall or other surface of a space to be protected. Each detection system can be individually operative to detect and indicate intruder presence, or can be coupled to a local or remote central station for central annunciation of intruder presence.

The invention is not intended to be limited by what has been particularly shown and described except as indicated in the appended claims.

What is claimed is:

1. A passive infrared intrusion detection system having multiple ranges and operative to detect an intruder moving through said ranges comprising a mirror assembly having a common optical axis and a common focus including:

at least two mirror ranks disposed about said common optical axis, each rank having a focal length and a reflecting area;

each mirror rank comprising at least one spherical mirror segment, each segment having an optical axis aligned with said common axis and a focal point at said common focus;

said mirror ranks arranged in spaced apart relationship along said common optical axis with respective focal lengths and reflecting areas increasing with increasing distance from said common focus for providing said multiple ranges with substantially uniform detection sensitivity for all said ranges; and a detector disposed at said common focus operative to provide electrical signals indicative of intruder detection.

2. The intrusion detection system of claim 1 including a third mirror rank disposed along the optical axis from the at least two mirror ranks and having one or more spherical mirror segments, each having a third focal length and a common focus with the at least two mirror ranks, and each oriented to provide respective fields of view for a third operating range.

3. The intrusion detection system of claim 2 wherein one of said at least two mirror ranks has one spherical mirror segment of a first surface area providing a first field of view;

and wherein the other of said at least two mirror ranks has on spherical mirror segment of second surface area smaller than the surface area of the first mirror segment and a second field of view smaller than the first field of view; and wherein the third mirror rank has two mirror segments, each of a third surface area smaller than the surface area of the second mirror segment, and a third field of view smaller than said second field of view, the mirror segments of the third rank being circumferentially disposed about the optical axis.

4. The intrusion detection system of claim 2 wherein each of said mirror ranks includes a plurality of spherical mirror segments circumferentially disposed about the optical axis.

5. The intrusion detection system of claim 1 wherein said ranks of mirror segments are mirror surfaces of an integral mirror assembly.

6. The intrusion detection system of claim 5 wherein said integral assembly is adjustably mounted on a mounting member for angular adjustment of the mirror assembly.

7. The intrusion detection system of claim 6 wherein said integral assembly includes mounting means adjustably attached to the mounting member and operative to be angularly adjusted for angular adjustment of the mirror assembly.

8. The intrusion detection system of claim 7 wherein said mounting means includes a post rearwardly extending from the mirror segments and a coaxially surrounding tubular member;

a first support member attached to the post and abutting the end of the tubular member and having a peripheral portion engaging a confronting surface of the mounting member; and a second support member affixed to the post and having a peripheral portion engaging an opposite surface of the mounting member and operating to clamp the mirror assembly in intended angular position.

9. The intrusion detection system of claim 7 wherein the mounting member includes an opening through which the end of the post extends;

a first support member slideably disposed on one side of the mounting member and attached to the post and tubular member;

a second support member disposed on the opposite surface of the mounting member and secured to the end of the post;

the post, tubular member, and first and second support members, being movable together for adjustment of the mirror assembly in one plane;

the post, tubular member, and second support member being movable in relation to the first support member and mounting member for adjustment of the mirror assembly in an orthogonal plane.

10. The intrusion detection system of claim 1 including signal processing circuitry operative in response to the detector signals to provide an alarm indication of intruder presence.

11. The intrusion detection system of claim 10 wherein the signal processing circuitry includes a temperature compensation circuit operative to adjust the sensitivity of the system in accordance with background temperature to provide more uniform sensitivity over an operating temperature range.

12. The intrusion detection system of claim 11 wherein said temperature compensation circuit includes a temperature sensing element operative to sense background temperature;

first circuit means for providing bipolar alarm threshold levels in accordance with sensed temperature; and second circuit means for providing a reference temperature adjustable in accordance with sensed temperature and midway of the bipolar threshold levels.

13. A detection system according to claim 1 wherein said spherical mirror segments comprising said respective mirror ranks are circumferentially offset.

14. A detection system according to claim 1 wherein the focal lengths of said spherical segments comprising respective mirror ranks increase by substantially a factor of two with each successive rank from said common focus.

15. A detection system according to claim 1 or 14 wherein the reflecting areas of each mirror rank increase by substantially a factor of four with each successive rank from said common focus.

16. An intrusion detection system comprising a mirror assembly having a plurality of spherical mirror segments arranged in two or more ranks, each corresponding to a different operating range, the mirror assembly including:

a first rank of spherical mirror segments, each having a first focal length to provide a first operating range, and each disposed about a common optical axis and each oriented to provide a respective field of view;

a second rank of spherical mirror segments disposed along the optical axis from the first rank, each having a second focal length and a common focus with the first rank to provide a second operating range, and each disposed about the common optical axis and each oriented to provide a respective field of view;

each of the mirror segments providing a substantially uniform optical aperture to achieve uniform detection sensitivity for all operating ranges;

a detector disposed at the focal distance of said plurality of segments of said first and second ranks and operative to provide electrical signals indicative of intruder detection as an intruder moves through the fields of view of said first and second ranks of mirror segments.

17. The intrusion detection system of claim 16 including a third rank of spherical mirror segments, each having a third focal length and a common focus to provide a third operating range and each disposed about the common optical axis and each oriented to provide a respective field of view.

* * * * *